March 21, 1967  T. A. BUCHHOLD  3,310,767
POWER CRYOTRON
Filed March 23, 1964  2 Sheets-Sheet 1
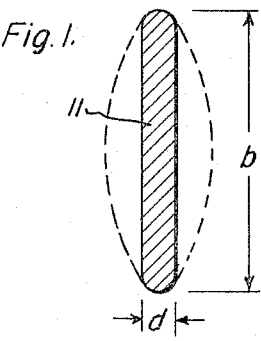
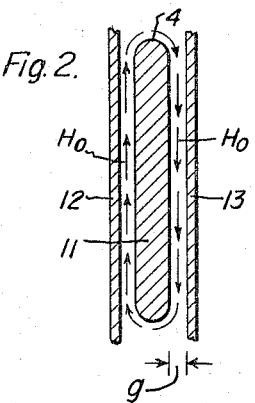
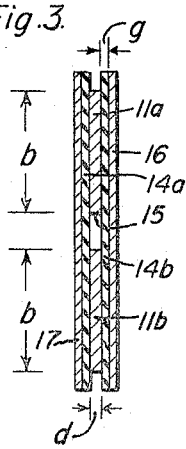
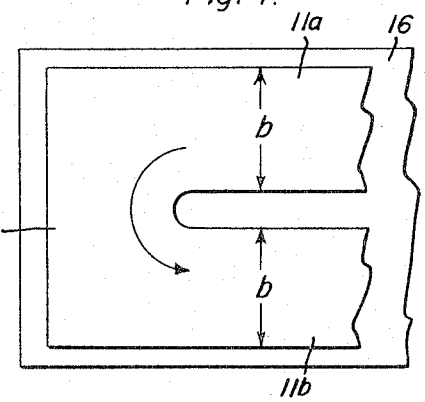
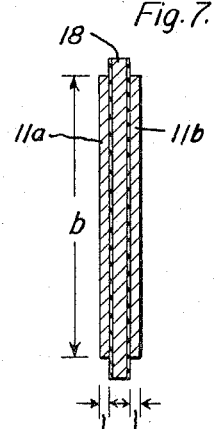
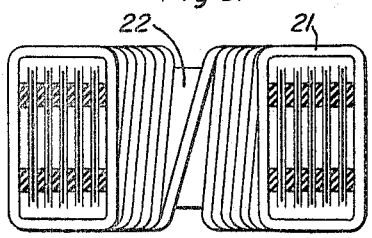
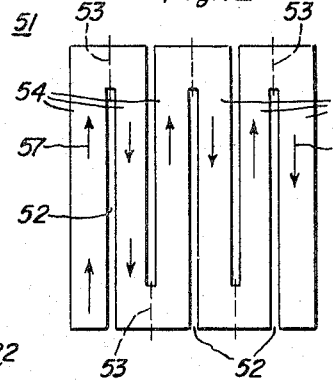
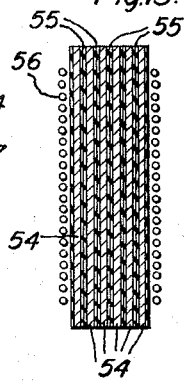
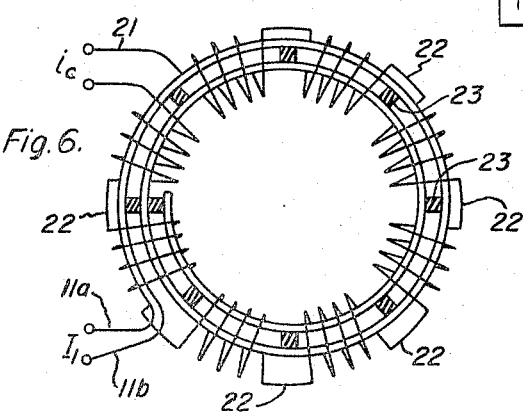
Inventor:
Theodor A. Buchhold,
by *(signature)*
His Attorney.

March 21, 1967 T. A. BUCHHOLD 3,310,767
POWER CRYOTRON
Filed March 23, 1964 2 Sheets-Sheet 2
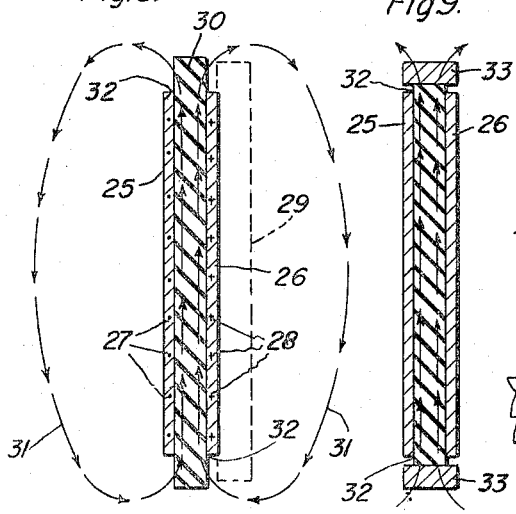
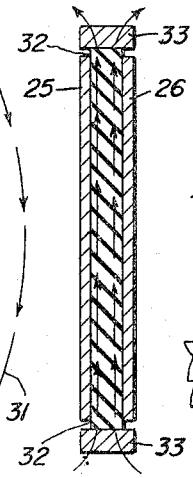
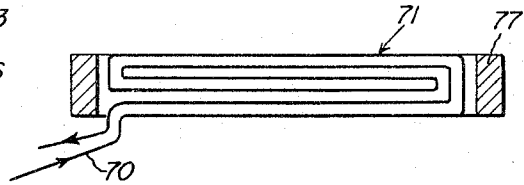
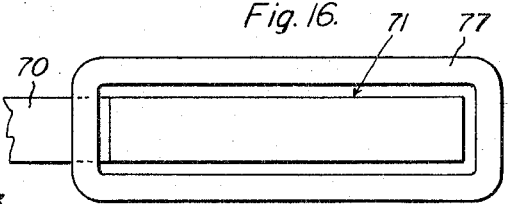
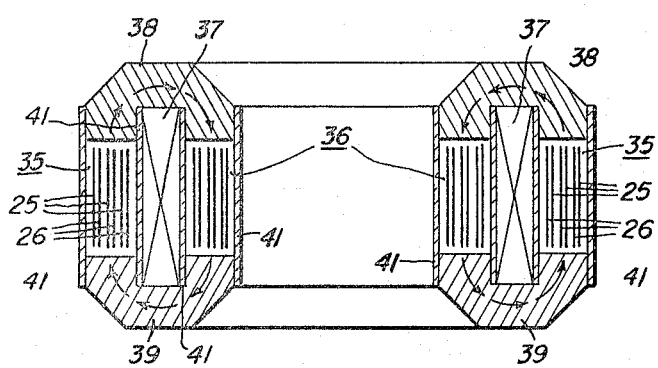
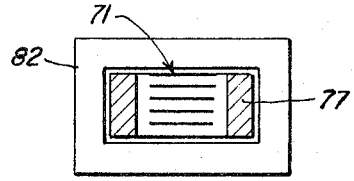
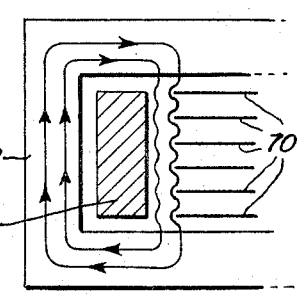
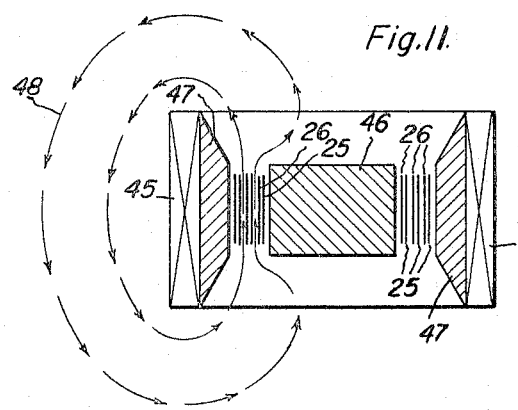
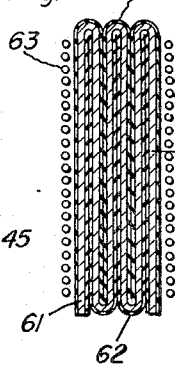
Inventor:
Theodor A. Buchhold,
by
His Attorney.

United States Patent Office 3,310,767
Patented Mar. 21, 1967

3,310,767
POWER CRYOTRON
Theodor A. Buchhold, Schenectady, N.Y., assignor to General Electric Company, a corporation of New York
Filed Mar. 23, 1964, Ser. No. 354,057
24 Claims. (Cl. 338—32)

This invention relates to a novel power cryotron. More particularly, the invention relates to a cryotron device which is uniquely capable of carrying and switching large superconducting currents in the order of hundreds and even thousands of amperes.

This is a continuation-in-part of my copending application Ser. No. 284,177, filed May 29, 1963, now forfeited (abandoned) and assigned to the assignee hereof.

A cryotron device is a device designed to operate at extremely low temperatures in the neighborhood of 0° Kelvin. The device is of such a nature that while operating at cryogenic temperatures, it can be switched from a superconducting condition to a non-superconducting condition by the application of an external magnetic field. Such devices are well known in the art, and generally comprise a wire fabricated from a first superconducting material such as lead which has a relatively low critical magnetic field strength, and which is surrounded by a field winding for producing the external switching magnetic field. The field winding is fabricated from a second superconducting material, such as niobium, which has a relatively high critical magnetic field strength when compared to the first superconducting material. In practical devices, the wires are replaced by films. For a more detailed description of the construction and operation of cryotrons, reference is made to the textbook entitled, "Superconductive Devices," by John W. Bremer, published by the McGraw-Hill Book Company, Inc., 1962.

The cryotron devices heretofore available in the art have been all designed for use with data handling and computer equipments, and operate at current levels in the milliampere region. The power cryotron comprising the present invention is intended for use at currents of hundreds and even thousands of amperes.

It is therefore a primary object of the present invention to provide a new and improved power cryotron device capable of carrying in the superconductive state large superconducting currents in the order of hundreds or thousands of amperes, and which in the non-superconductive state has a large resistance.

In practicing the invention, a power cryotron structure is provided which includes in combination a plurality of electrically insulated layers of relatively wide superconducting material having a first critical magnetic field strength, and interconnected to form a continuously relatively long superconducting path and a control winding of second superconducting material having second critical magnetic field strength greater than the first magnetic field strength wound around the tape of first superconducting material.

In a preferred embodiment of the invention, a power cryotron structure is provided which includes a relatively wide composite tape comprised by two relatively wide tapes of first superconducting material having a first critical magnetic field strength which are secured together. The two tapes are spaced apart a small distance less than the thickness of the tapes, and are electrically insulated from each other except at one end where they are connected together. By this arrangement, current flows through the tapes in opposite directions. The composite tape is rolled in the form of a coil, and a control winding of a second superconducting material having a second critical magnetic field strength greater than the first critical magnetic field strength surrounds the coiled composite tape. In this preferred arrangement, the control winding is annularly wound in the form of a cylinder having a length greater than the width of the annularly coiled tape of first superconducting material, and is concentrically arranged around the exterior of the annularly coiled first superconducting tape, and a superconducting shielding member disposed in the central opening of the annularly coiled first superconducting tape for directing the lines of flux of the control winding through the turns thereof.

In another preferred embodiment of this invention, the control element is arranged relative to the superconducting tape so that the edge portions of the tape are subjected to magnetic fields of greater strength than those applied to the remaining parts of the tape. Further, low magnetic reluctance paths are provided around the control element from one side of the tape to the other to maximize the flux applied along the tape edges and expedite quenching of the superconductive state in the tape.

Other objects, features, and many of the attendant advantages of this invention will be appreciated more readily as the same become better understood by reference to the following detailed description, when considered in connection with the accompanying drawings wherein like parts in each of the several figures are identified by the same reference character, and wherein:

FIGURE 1 is a cross-sectional view of a relatively flat superconducting tape which can be used in fabricating a power cryotron in accordance with the invention;

FIGURE 2 is a cross-sectional view of a composite tape structure wherein the relatively flat superconducting tape shown in FIGURE 1 is arranged between two flat superconducting shields;

FIGURE 3 is a cross-sectional view of a practical composite superconducting tape such as that illustrated in FIGURE 2, and shows the manner of fabrication of such tape;

FIGURE 4 is a partially broken-away plan view of the end portion of the composite superconducting tape structure shown in FIGURE 3;

FIGURE 5 is a cross-sectional view of a toroidal power cryotron constructed in accordance with the present invention;

FIGURE 6 is a schematic plan view of the toroidal power cryotron device shown in FIGURE 5, and illustrates the manner of its construction;

FIGURE 7 is a cross-sectional view of an alternative composite superconducting tape structure suitable for use in fabricating the present invention;

FIGURE 8 is a cross-sectional view of a third alternative superconducting tape structure suitable for use in fabricating a power cryotron in accordance with the present invention;

FIGURE 9 is a cross-sectional view of still a fourth alternative superconducting tape structure suitable for use in fabricating a power cryotron in accordance with the invention;

FIGURE 10 is a cross-sectional view of a second form of toroidally-shaped power cryotron constructed in accordance with the invention, and employing the tape structure depicted in FIGURE 9;

FIGURE 11 is a cross-sectional view of a third form of toroidally-shaped power cryotron constructed in accordance with the invention which employs superconductive shielding members to guide the magnetic flux lines produced by the control winding, through the cryotron structure;

FIGURE 12 is a plan view of a pre-cut sheet of superconductive material, and illustrates another alternative manner of constructing a power cryotron in accordance with the invention;

FIGURE 13 is a sectional view of a power cryotron constructed from the superconductive sheet shown in FIGURE 12;

FIGURE 14 is a sectional view of still another form of power cryotron constructed in accordance with the invention;

FIGURE 15 is a partly-diagrammatic, vertical sectional view of an assembly of a bifilar-arranged superconducting tape and a control element;

FIGURE 16 is a top plan view of the assembly of FIGURE 15;

FIGURE 17 is a transverse cross-sectional view of a preferred power cryotron assembly of this invention incorporating the assembly of FIGURE 15 and a shell of iron surrounding and enclosing the tape and control element; and FIGURE 18 is an enlarged sectional view of the FIGURE 17 assembly showing the application of control element magnetic flux to the superconducting tape edges.

FIGURE 1 is a cross-sectional view of a relatively wide flat superconducting tape 11 having a width $b$ and a thin thickness $d$. For a power cryotron, it is desirable that the possible current be proportional to $b$, but that the thickness $d$ should not matter since $d$ should be small in order to have a high resistance in the normal state. However, FIGURE 1 does not fulfill this requirement since if the current I is caused to flow through the flat superconducting tape 11, it will produce its greatest field strength H at the edges of the tape 11. This field strength H can be calculated approximately if the cross section of the tape 11 is taken to be that of an ellipse as shown by the dotted lines which has at its top a radius of curvature equal to the $r=d/2$. This calculation results in a value for I as given by the following expression:

$$I = 2.5H\sqrt{bd} \qquad (1)$$

From an examination of Equation 1, it can be appreciated that for a given field strength H, a small thickness $d$ gives a small current I, and the current I increases only as the square root of the width $b$ of the flat tape of superconducting material 11.

The current-carrying capability can be considerably improved if the relatively wide flat tape of superconducting material 11 is disposed between a pair of wide flat thin sheets of the superconducting material 12 and 13 of comparative width to the tape 11 as shown in FIGURE 2 of the drawings. If it is assumed that the flat wide superconducting tape 11 is separated from each of the superconducting shield 12 and 13 by a constant gap $g$, then the field strength $H_0$ produced by the flux (indicated by the arrows) on both sides of the superconductive tape 11 is constant. Similarly, since the current density $j$ is dependent upon the field strength $H_0$, the current density $j$ will be constant, and is equal to ($j=H_0/1.25$). The magnetic flux produced in each of the gaps $g$ of the structure shown in FIGURE 2 will produce a magnetic pull which for both gaps is given by the expression:

$$F_g = 2kH_0^2 g \qquad (2)$$

where $k$ is a constant. This force $F_g$ produces a reaction in accordance with Newton's third law that every action produces an equal and opposite reaction. The reaction to the force $F_g$ is found by the pressure force of the magnetic lines on the edges or corners of the flat wide superconducting tape 11. Assuming that around each corner of the superconducting tape 11 the R.M.S. value of the field strength is H, then the vertical force acting on the corner is given by the expression:

$$F_c = kH^2 d \qquad (3)$$

since both forces $F_c$ and $F_g$ must be equal in accordance with Newton's third law stated above, then it follows that:

$$F_c = F_g \text{ or } 2kH_0^2 g = kH^2 d$$

or $$H = H_0\sqrt{2g/d} \qquad (4)$$

From a consideration of Equation 4, it can be appreciated that if H shall not be bigger than $H_0$, the thickness of the gap $g$, and hence any insulation placed in the gap must be of a dimension such that $g \leq d/2$. This expression for $g$, which is only approximate, shows that the insulation has to be thin, preferably smaller than the tape thickness $d$. The current obtainable with a structure such as shown in FIGURE 2 of the drawings, assuming a field strength $H_0$ will then be given by multiplying the width of both sides of the flat wide superconducting tape 11 (2$b$) by the current density $j$ as follows:

$$I = j \times (2b) = \frac{H_0}{1.25}(2b) \qquad (5)$$

From a comparison of Equations 1 and 5 above, it can be appreciated that the maximum current obtainable for a given H with the structure of FIGURE 2 is independent of the thickness $d$ of the tape, and now increases with the width $b$ of the flat wide superconducting tape instead of only with the square root of the width $b$ as with the structure of FIGURE 1. Accordingly, a considerable increase in current-carrying capacity is attainable with the structure of FIGURE 2. It should be noted that if only one side of the flat wide superconducting tape 11 is shielded, a smaller maximum current I can be obtained for a given field strength H, since with such a variation, the non-shielded side of the tape will have less flux density, and therefore less current density $j$. However, because of its greater simplicity, such an arrangement can be very useful.

A cross-sectional view of one practical form of a composite superconducting tape fabricated in accordance with the principles discussed with relation to FIGURE 2 of the drawings, is shown in FIGURE 3. In FIGURE 3, the composite superconducting tape structure is comprised by a first relatively wide flat tape of superconducting material which is joined together at one end 11$e$ (shown in FIGURE 4 of the drawings), and is split along its entire length as shown at 15 into two halves 11$a$ and 11$b$. The two halves form long superconducting paths 11$a$ and 11$b$, each of which is defined to have a width $b$ in accordance with the principles discussed above. The first superconducting tape 11$a$, 11$b$ is fabricated from a first superconducting material having a first critical magnetic field strength, and both halves 11$a$ and 11$b$ have a thickness $d$ as indicated. The first superconducting tape 11$a$, 11$b$ is sandwiched between two relatively wide flat superconducting shields 16 and 17 of comparative width to the first superconducting tape 11$a$, 11$b$. The shielding tapes 16 and 17 are mechanically secured to opposite sides of the first superconducting tape 11$a$ and 11$b$ by films or layers of glue 14$a$ and 14$b$ or other suitable electrically insulating bonding material, and are formed from a superconducting material having a higher critical magnetic field strength than that of the superconducting material 11$a$ and 11$b$. For example, if the superconducting material 11$a$, 11$b$ is fabricated from lead, then the superconducting shields 16 and 17 can be fabricated from niobium. In accordance with the discussion outlined above, it is preferred that the thickness of the glue or other electrically insulating bonding material between the shields 16 and 17 and the tape 11$a$, 11$b$ have a thickness $g$ which is equal to or less than $d/2$.

With a composite superconducting tape structure such as that shown in FIGURE 3 of the drawings, the composite tape is then rolled into the form of an annular coil as shown in FIGURE 5 of the drawings, and illustrated schematically in FIGURE 6 of the drawings. In FIGURE 6, the conductors 11$a$ and 11$b$ represent the relatively wide flat tapes 11$a$ and 11$b$ of the composite tape structure shown in FIGURES 3 and 4 of the drawings, and when thus coiled have only a small inductance which is to be desired. A control winding shown at 21 in FIGURE 5 and FIGURE 6 of the drawings, is helically wound around the coiled composite superconducting tape structure in the manner shown. The control winding 21 is fabricated from a third superconducting material having a third critical magnetic field strength which is greater than the first critical magnetic field strength of the relatively wide flat superconducting tape $11a$, $11b$. For example, if the superconducting tape $11a$, $11b$ is fabricated from lead, then the control winding 21 may be fabricated from niobium. By critical magnetic field strength is meant the minimum external magnetic field required to change a superconductor such as lead or niobium from its superconducting condition to its normally conducting or resistive condition whereby the conductor will exhibit a finite resistance to the flow of electric current therethrough. It has been determined that such switching can be achieved both by raising the temperature of the superconductor and by varying an externally applied magnetic field to which the superconductor is exposed. The present power cryotron, in order to be fast, switches the superconductor $11a$, $11b$ from its normally superconducting condition to its non-superconducting or resistive condition by varying the magnetic field applied thereto. This variation of the applied magnetic field is achieved by supplying a control or switching current $I_c$ to the input terminals of the field winding 21 illustrated in FIGURE 6 of the drawings. In a preferred arrangement of the power cryotron fabricated in accordance with the present invention, the turns of the helically wound control winding 21 will be left open at spaced-apart intervals 22 around the periphery of the coiled composite superconducting tape in order to provide access for refrigerants to the surfaces of the turns of the coiled composite tape. Additionally, the turns of the coiled composite tape $11a$, $11b$ and 16, 17 may be spaced apart at predetermined intervals by suitable insulating spacers indicated at 23 in FIGURE 6 in order to provide access for refrigerants to the turns of the coiled composite superconducting tape.

Before placing the power cryotron in FIGURES 5 and 6 in operation, it is of course first necessary to place the device in a suitable insulating housing and submerse it in a cryogenic fluid such as liquid helium to reduce the temperature of the device to the cryogenic temperatures required for superconduction. Techniques for accomplishing this objective are described in the above-identified textbook, "Superconducting Devices." After establishing the cryogenic environment, an electric current $I_1$ to be switched by means of the power cryotron is then supplied to the conductor $11a$, for example. This current then will travel the entire length of the relatively wide flat tape half $11a$ to the turn around connection $11e$ at the end of the tape, and then will travel back through all of the turns of the coiled composite tape structure through tape half $11b$. Assuming that no control current $i_c$ is supplied to the input terminals of the control winding 21, then the conductors comprised by $11a$ and $11b$ will be in their superconducting condition, and will exhibit absolutely no resistance to the flow of electric current $I_1$ therethrough. However, upon the application of a switching control signal $i_c$ to the input terminals of the control winding 21, flow of a control current $i_c$ produces an external switching magnetic field which causes the superconducting paths $11a$ and $11b$ to be rendered non-superconducting or normally resistive in nature. Thereafter, upon the removal of the switching control signal $i_c$ from the control winding 21, the conductors $11a$ and $11b$ will be again rendered superconducting almost simultaneously with the removal of the switching control signal $i_c$. In order to have a high resistance in the non-superconductive state, the cryotron tape has to be thin and long. In order to avoid excessive heating, no large D.C. inductive currents should be switched "off" continuously. Inductive A.C. current can, with proper control, be switched "off" if the current goes through zero. Further, in order to keep the inductance of the control winding and its stored magnetic energy small, the wound tape should occupy as little space as possible.

While in the above description of the composite tape structure shown in FIGURES 3 and 4, it was indicated that the shielding superconductors 16 and 17 of niobium were glued to the relatively wide superconductor tape $11a$ and $11b$ of lead, it would be possible to anodize the surfaces of the shielding superconductors 16, 17 and to form the composite tape structure by rolling the three tapes together to form the annular coil without requiring the additional insulating surfaces formed by the glue in the space $g$.

An alternative arrangement to the composite tape structure shown in FIGURES 3 and 4, is illustrated in FIGURE 7 of the drawings. In the arrangement of FIGURE 7, two relatively wide superconducting tapes $11a$ and $11b$ which shall have currents in opposite directions, are shown secured to a central superconducting shielding tape 18 of comparative width as by gluing, anodizing, or other means. The tapes $11a$ and $11b$ are electrically insulated from each other and from the center shielding tape 18, but at one end both tapes are connected with each other. In fabricating the structure of FIGURE 7, the two relatively wide superconducting tapes $11a$ and $11b$ may be formed from lead, and the superconducting shielding tape 18 formed from niobium.

In constructing a power cryotron from the composite tape structure shown in FIGURE 7, this composite superconducting tape structure is wound in an annular coil in the manner similar to that shown in FIGURES 5 and 6, and surrounded with a suitable control winding 21 in the same fashion. The resulting structure will operate in the same manner as the power cryotron of FIGURES 5 and 6. With such a power cryotron, however, one of the relatively wide flat superconducting tapes $11a$ (for example) will carry current in one direction, and the remaining wide superconducting tape $11b$ will carry current in the opposite direction. Accordingly, alternate current-carrying turns of the coil will carry current in opposite directions relative to each other.

Theoretically, it is possible to omit the shielding tape 18 of the structure shown in FIGURE 7 of the drawings. If the center shield 18 is omitted, the resulting structure would be as shown in FIGURE 8 of the drawings wherein the remaining two relatively wide superconducting tapes 25 and 26 carry currents in opposite directions as shown by the arrowheads (.) at 27 the (+) signs at 28. By this arrangement, the two superconducting tapes 25 and 26 tend to shield each other. Since it is desirable to fabricate the superconducting tapes 25 and 26 out of very thin niobium, it may be necessary that the two superconducting tapes be mounted on, and secured to a suitably strong insulating backing member indicated in dotted lines at 29. The two superconducting tapes 25 and 26 will be secured together by a suitable adhesive 30, and are electrically insulated from each other except at one end. If the two superconducting tapes 25 and 26 are fabricated from niobium, then the control winding to be used with them must be fabricated from a material having a higher critical magnetic field strength than that of niobium, and hence must be made of a material such as niobium-zirconium. In operation, current flows on the inside surfaces of the tapes 25 and 26 in opposite directions as indicated by the arrows 27 and 28. As a consequence, the magnetic lines of flux shown at 31 press against the edges 32 of the superconducting tapes, and as stated earlier, produce the highest field strength at these points, especially if the corners are not rounded. To minimize this effect, the two superconducting tapes 25 and 26 are spaced apart a small distance $g$ less than the thickness of the tapes.

FIGURE 9 of the drawings shows an alternative arrangement for minimizing the edge effect of the magnetic field, and comprises a superconducting tape structure employing two relatively wide superconducting tapes 25 and 26 which carry current in opposite directions. Mounted on the edges of the superconducting tapes 25 and 26 are small rims 33 which are formed from a material having low magnetic reluctance and low eddy current losses, such as powdered iron or ferrite. These low magnetic reluctance rims 33 will minimize the reactive force caused by the pull of the lines of magnetic flux at the edges 32 in that they provide low reluctance paths in this critical area for the magnetic lines of flux thereby reducing the field strength at the edges 32.

FIGURE 10 of the drawings shows a cross-sectional view of an entire power cryotron fabricated from a superconducting tape structure such as shown in FIGURE 8 minus the insulating backing member 29, but employing a low magnetic reluctance rim as a part thereof. The power cryotron shown in FIGURE 10 is formed from two superconducting tapes 25 and 26 wound in the form of two annular coils, an outer annular coil 35 and an inner annular coil 36. Disposed intermediate the inner and outer annular coils 35 and 36 is cylindrical control winding 37 which is formed from a second superconducting material having a critical magnetic field strength greater than the critical magnetic field strength of the material out of which the superconducting tapes 25 and 26 are fabricated. The control winding 37 is shaped in the form of a cylinder whose length is greater than the width of the superconducting tapes 25 and 26 so that the wires from which the control winding is fabricated are exposed only to a substantially reduced magnetic field, thereby avoiding superconducting breakdown of these wires. Positioned over the edges of the annularly wound superconducting tapes 25 and 26 are annular rims 38 and 39 which are fabricated from a material having a low magnetic reluctance and low eddy current losses such as ferrite or powdered iron, and provide low magnetic reluctance paths between the edges of the annularly coiled superconducting tapes 25 and 26.

In order to insure that all of the magnetic lines of flux produced by the control winding 37 thread through the superconducting tapes 25 and 26 forming the annular coils 35 and 36, superconductive guide members shown at 41 are provided at the outer and inner peripheries of each of the annularly wound coils 35 and 36. These superconductive guide members 41 extend between the ends of the low magnetic reluctance rims 38 and 39 so that all of the magnetic flux lines produced by the control winding 37 are confined within the space defined by these members and the low magnetic reluctance rims 38 and 39. It should be noted, however, that the superconducting shield members 41 must be fabricated from a superconducting material which has a higher critical magnetic field strength than the material out of which the superconducting tapes 25 and 26 are formed. Further, the two inner superconducting shields 41 immediately adjacent the control winding 37 must have a thin radial slit (not shown) formed therein in order to prevent the development of circulating currents through these members.

In manufacturing the annularly wound superconducting coils 35 and 36, they will be formed in much the same manner as shown in FIGURE 6 of the drawings so that current through one of the superconducting tapes 25 travels in a direction opposite to the current through the next adjacent superconductive tape 26. In operation, the arrangement of FIGURE 10 will function in the same manner as described with relation to the power cryotron shown in FIGURES 5 and 6, and hence will not again be described in detail.

FIGURE 11 of the drawings shows still another form of power cryotron constructed in accordance with the invention. In the power cryotron of FIGURE 11, a pair of superconducting tapes 25 and 26 similar to those shown in FIGURE 8 are wound in the form of an annular coil. A control winding is provided which is fabricated from a material which is superconducting, but which has a higher critical magnetic field strength than the critical magnetic field strength of the material out of which the superconducting tapes 25 and 26 are constructed. This control winding 45 is wound in the form of a cylinder, and is concentrically arranged around the exterior of the annularly formed coil 25, 26. The length of the cylindrically wound control winding 45 is greater than the width of the superconducting tapes 25 and 26 so as to reduce the magnetic field to which the wires out of which the control winding is fabricated, is exposed, thereby avoiding superconductive breakdown of these wires. A closed, cylindrically-shaped superconductive shielding member shown at 46 is disposed in the central opening of the annularly wound superconductive tapes 25, 26, and preferably a second superconductive shielding member 47 which is cylindrical in nature is disposed in the space intermediate the cylindrically wound control winding 45 and the external circumference of annularly wound superconducting tapes 25 and 26. Again, the superconductive cylindrical member 47 must have a small radial slit (not shown) formed therein to prevent the development of undesired circulating currents. In operation, the superconducting shielding members 46 and 47 serve to confine the magnetic lines of flux, shown at 48 produced by the cylindrical control winding 45 to the space in which the tapes 25 and 26 are disposed. By this means, the magnetic lines of flux produced by the control winding are guaranteed to thread through the superconductive tapes 25 and 26. In other respects, the power cryotron structure shown in FIGURE 11 will function in a manner similar to the arrangement of FIGURES 5 and 6, and hence will not be again described in detail.

Still another form of power cryotron constructed in accordance with the present invention is illustrated in FIGURES 12 and 13 of the drawings. In FIGURE 12, a relatively thin, flat sheet of superconductive material is shown at 51, which preferably is rectangular or square in configuration as illustrated. The thin, flat sheet of superconducting material 51 has a plurality of slits 52 cut in one set of opposed edges thereof which extend across almost the entire width of the sheet 51. The sheet 51 is then folded accordion-fashion along the dotted lines indicated at 53 which are extensions of the slits 52 so as to form a plurality of layers of relatively wide superconductor tapes 54 which are interconnected to form a continuous relatively long superconducting path. Prior to folding the sheet of superconducting material 51, however, it is preferred that the surfaces thereof be electrically insulated as by anodizing if the sheet of material 51 is niobium, or if some other superconducting material is used, some other electrically insulating coating 55 is formed over both its flat surfaces. Upon folding the sheet 51 shown in FIGURE 12, the structure will appear as shown in FIGURE 13 which is a sectional view of a power cryotron fabricated from the sheet 51. Subsequent to folding the sheet 51 to form the plurality of electrically insulated layers indicated at 54, the folded structure is surrounded with a control winding shown at 56 which is fabricated from a second superconducting material having a critical magnetic field strength greater than the critical magnetic field strength of the superconducting material from which the sheet 51 is fabricated. In operation, the power cryotron in FIGURE 13 will have current flowing along the strips 54 so that the current flows through adjacent strips in opposite directions as indicated by the arrows 57 in FIGURE 12. In all other respects, the power cryotron of FIGURES 12 and 13 will function in the same manner as described with relation to the power cryotron in FIGURES 5 and 6, and hence will not again be described in detail.

Still another form of power cryotron constructed in accordance with the invention is shown in FIGURE 14 of the drawings. The power cryotron shown in FIGURE 14 is comprised by a relatively long tape 61 fabricated from a superconducting material having a first critical magnetic field strength, and having an electrically insulating coating 62 formed over both of its flat surfaces. The tape 61 is folded accordion-fashion in the form of a flat spring, and the folded tape is surrounded by a control winding 63 fabricated from a second superconductive material having greater critical magnetic field strength than the first material 61. In operation, because of the manner in which the layers are folded, current flowing along the folded tape will be conducted through adjacent layers in opposite directions so as to effect a desired mutual shielding action. In other respects, the power cryotron shown in FIGURE 14 will operate in the same manner as the species of invention shown in FIGURES 5 and 6, and hence will not again be described in detail.

With reference to the embodiment of the invention illustrated in FIGURES 15 to 18, inclusive, the special advantage of expedited quenching of the superconductive state is accomplished by virtue of the special structural and functional relationships between the superconducting tape and the control element of the assembly. In these drawings, a niobium tape 70 is bifilarly arranged or wound to provide a stacked or laminated body 71, the turns or laminations of the tape being suitably insulated and spaced from each other as described above. Body 71 is surrounded by a control element, in this case coil 77 of niobium-zirconium wire, which is of height approximating that of body 71 and is of inside dimension such that body 71 is closely and uniformly spaced along the sides of coil 77. Spacing between body 71 and coil 77 is maintained by glue or other suitable electrical insulation on the sides and at the ends of the body. Body 71 and coil 77 constitute a power cryotron in that the superconductive state in body 71 is maintained so long as coil 77 is not energized, and this state is quenched quickly and body 71 becomes resistive when coil 77 is energized and body 71 and particularly the edge portions of the body are subjected to magnetic flux produced by coil 77.

The cryotron of FIGURES 15 and 16 is assembled, as shown in FIGURE 17, with a laminated iron core 82 having a central opening a little larger in length and width than the cryotron assembly and of depth or length such that during operation, the assembly is wholly contained within core 82. Again, suitable insulating means are provided at the ends and along the sides of the cryotron. An important function of core 82 is to provide a path of low magnetic reluctance around coil 77 from the bottom surface of body 71 of the top surface thereof, as indicated by the arrows in FIGURE 18.

The cryotron can easily be quenched since at the edges, due to the concentration of the magnetic flux lines, a high magnetic field strength is produced as soon as coil 77 is energized. During switching, eddy current losses are produced in the cryotron, which are smaller if the tape is not too wide. If for large currents, a wide tape is needed, it is better to subdivide it in a few parallel connected tapes of smaller width.

From the foregoing description, it can be appreciated that the present invention provides several power cryotron devices which are capable of carrying and switching large superconducting currents in the order of hundreds or even thousands of amperes. Having described several embodiments of a power cryotron constructed in accordance with the invention, it is believed obvious that other modifications and variations of the present invention are possible in the light of the above teachings. For example, body 71 may be made in the form of a ring. Coil 77 and core 82 would then likewise take ring-form and FIGURE 17 would then represent a cross-section taken radially through the ring assembly of coaxially disposed components.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the specifically described embodiments of the invention may be made without departing from the scope of the invention as set forth in what is claimed.

What I claim as new and desire to secure by Letters Patent of the United States is:

1. A power cryotron including in combination a relatively wide tape of first superconducting material having at least one electrically insulated surface and a first critical magnetic field and wound in the form of an annular coil, means for minimizing the field strength acting on the edges of the superconducting tape, and a control winding of second superconducting material having a second critical magnetic field strength greater than the first critical magnetic field strength surrounding and spaced apart in electrically insulating relation to the annularly wound coil of first superconducting material.

2. The combination set forth in claim 1 wherein the means for minimizing the field strength acting on the edges of the superconducting tape comprises at least one superconducting shield having a critical magnetic field strength greater than the first critical magnetic field strength and being of comparative width to the superconducting tape spaced apart from the superconducting tape at a small distance less than the thickness of the superconducting tape, with the superconducting tape and shield structure being rolled together to form the annular coil.

3. The combination set forth in claim 1 wherein the means for minimizing the field strength acting on the edges of the superconducting tape comprises a center superconducting shield having a critical magnetic field strength greater than the first critical magnetic field strength and being of comparative width to the superconducting tape with the superconducting tape bearing against opposite flat surfaces of the center shield and with the superconducting tape on opposite sides of the center shield carrying current in opposite directions, the composite superconducting shield and tape structure being rolled together to form the annular coil.

4. The combination set forth in claim 1 wherein the means for minimizing the field strength acting on the edges of the superconducting tape comprises a third superconducting tape having a critical magnetic field strength greater than the first critical magnetic field strength and being spaced apart from the first superconducting tape at a small distance less than the thickness of the tapes and electrically insulated therefrom, the tapes carrying current in opposite directions, and being rolled together to form the annular coil.

5. The combination set forth in claim 1 wherein the means for minimizing the field strength acting on the edges of the superconducting tape comprises a rim secured over adjacent edges of the annularly coiled tape, the rim being formed from a material having low magnetic reluctance and having a critical magnetic field strength greater than the first critical magnetic field strength.

6. A power cryotron including in combination a relatively wide composite tape comprised by a relatively wide tape of first superconducting material joined together at one end but split along its entire length to form a doubly long superconducting path, and having a first critical magnetic field strength, two additional superconducting shielding tapes of comparative width to the first tape, mechanically secured on opposite sides of the first superconducting tape, the superconducting shielding tapes having a critical magnetic field strength greater than the first critical magnetic field strength and being spaced apart from the first superconducting tape a small distance less than the thickness of the first superconducting tape and electrically insulated from said first superconducting tape, the composite tape being rolled in the form of a coil, and a control winding of second superconducting material having a second critical magnetic field strength greater than the first critical magnetic field strength surrounding and electrically insulated from the coiled composite tape of first superconducting material and shielding superconducting tapes.

7. A power cryotron including in combination a relatively wide tape of first superconducting material having a first critical magnetic field strength and wound in the form of an annular coil, means for minimizing the field strength acting on the edges of the superconducting tape, and a control winding of second superconducting material having a second critical magnetic field strength greater than the first critical magnetic field strength surrounding and electrically insulated from the annularly wound coil of first superconducting tape, the control winding being annularly wound in the form of a cylinder preferably having a length greater than the width of the annularly coiled first superconducting tape, and being concentrically arranged with respect to the annularly coiled first superconducting tape.

8. A power cryotron including in combination a relatively wide tape of first superconducting material having a first critical magnetic field strength and wound in the form of an annular coil, means for minimizing the field strength acting on the edges of the superconducting tape, a control winding of second superconducting material having a second critical magnetic field strength greater than the first critical magnetic field strength surrounding the annularly wound coil of first superconducting tape, the control winding being annularly wound in the form of a cylinder having a length greater than the width of the annularly coiled tape of first superconducting material, and being concentrically arranged around the exterior of the annularly coiled first superconducting tape, and a superconducting shielding member having a critical magnetic field strength greater than the first critical magnetic field strength and being disposed in the central opening of the annularly coiled first superconducting tape for directing the lines of flux of the control winding through the turns of the annularly coiled first superconducting tape.

9. The combination set forth in claim 8 wherein the means for minimizing the field strength acting on the edges of the superconducting tape comprises at least one superconducting shield of comparative width to the superconducting tape spaced apart and electrically insulated from the superconducting tape a small distance less than the thickness of the superconducting tape, with the composite superconducting tape and shield structure being rolled together to form the annular coil.

10. The combination set forth in claim 8 wherein the means for minimizing the field strength acting on the edges of the superconducting tape comprises a superconducting tape of comparative width to the superconducting tape with the superconducting tape being secured to opposite flat surfaces of the center shield and with the superconducting tape on opposite sides of the center shield carrying current in opposite directions, the composite superconducting shield and tape structure being rolled together to form the annular coil.

11. The combination set forth in claim 1 wherein the means for minimizing the field strength acting on the edges of the superconducting tape comprises a third superconducting tape spaced apart from the first superconducting tape a small distance less than the thickness of the tapes and electrically insulated therefrom, the tapes carrying current in opposite directions and being rolled together to form the annular coil.

12. The combination set forth in claim 7 wherein the means for minimizing the field strength acting on the edges of the superconducting tape comprises a rim secured over adjacent edges of the annularly coiled tape, the rim being formed from a material having low magnetic reluctance.

13. A power cryotron including in combination a relatively wide tape of first superconducting material having a first critical magnetic field strength and wound in the form of an annular coil, means for minimizing the field strength acting on the edges of the superconducting tape, a control winding of second superconducting material having a second critical magnetic field strength greater than the first critical magnetic field strength surrounding and spaced apart in electrically insulating relation to the annularly coiled first superconducting tape, the control winding being helically wound around the annularly coiled first superconducting tape with the turns of the helically wound control winding being left open at spaced apart intervals around the periphery of the annularly coiled first superconducting tape to provide access for refrigerant to the surfaces of the first superconducting tape.

14. A power cryotron including in combination a relatively wide tape of first superconducting material having a first critical magnetic field strength and wound in the form of an annular coil, means for minimizing the field strength acting on the edges of the superconducting tape, a control winding of second superconducting material having a second critical magnetic field strength greater than the first critical magnetic field strength surrounding the annularly coiled first superconducting tape, the turns of the coiled first superconducting tape being spaced apart by suitable insulating spacers to provide access for refrigerant to the individual turns of the coil, and the turns of the helically wound control winding being left open at spaced apart intervals around the periphery of the coiled first superconducting tape to provide access for refrigerant to the surfaces of the individual turns of the first superconducting tape.

15. The combination set forth in claim 14 wherein the means for minimizing the field strength acting on the edges of the superconducting tape comprises at least one superconducting shield having a critical magnetic field strength greater than the first critical magnetic field strength and being of comparative width to the superconducting tape spaced apart and electrically insulated from the superconducting tape a small distance less than the thickness of the superconducting tape, with the composite superconducting tape and shield structure being rolled together to form the annular coil.

16. The combination set forth in claim 14 wherein the means for minimizing the field strength acting on the edges of the superconducting tape comprises a center superconducting shield having a critical magnetic field strength greater than the first critical magnetic field strength and being of comparative width to the superconducting tape with the superconducting tape being secured to opposite flat surfaces of the center shield and with the superconducting tape on opposite sides of the center shield carrying current in opposite directions, the composite superconducting shield and tape structure being rolled together to form the annular coil.

17. The combination set forth in claim 14 wherein the means for minimizing the field strength acting on the edges of the superconducting tape comprises a third superconducting tape having a critical magnetic field strength greater than the first critical magnetic field strength and being spaced apart from the first superconducting tape a small distance less than the thickness of the tapes and electrically insulated therefrom, the tapes carrying current in opposite directions and being rolled together to form the annular coil.

18. A power cryotron including in combination a relatively wide composite tape comprised by two relatively wide tapes of first superconducting material having a first critical magnetic field strength, the two superconducting tapes being secured together and spaced apart a small distance less than the thickness of the tapes, a comparatively wide tape of backing insulation material secured to one of said tapes, the composite tape being rolled in the form of a coil, and a control winding of second superconducting material having a second critical magnetic field strength greater than the first critical magnetic field strength surrounding the coiled composite tapes of first superconducting material and backing insulating material.

19. A power cryotron including in combination a relatively thin sheet of first superconductive material having a first critical magnetic field strength and an electrically insulating surface thereover, the sheet of first superconducting material having a plurality of slits cut in one set of opposed edges thereof and being folded accordion-fashion along the slits, and a control winding fabricated from a second superconducting material having a critical magnetic field strength greater than the first critical magnetic field strength surrounding the folded first superconductive sheet for switching the conductor formed by the sheet from its superconducting to its non-superconducting condition.

20. A power cryotron including in combination a plurality of electrically insulated layers of relatively wide superconductors having a first critical magnetic field strength, and interconnected to form a continuous relatively long superconducting path and a control winding of a second critical magnetic field strength greater than the first magnetic field strength surrounding the plurality of electrically insulated layers of first superconducting material.

21. A power cryotron comprising a plurality of electrically insulated layers of relatively wide superconductors having a first critical magnetic field strength, and interconnected to form a continuous relatively long superconducting path and to provide continuous top and bottom surfaces and edge portions extending the length of the superconducting path, and a superconducting control element of second critical magnetic field strength greater than the first critical magnetic field strength, said control element being disposed adjacent to the edge portions of the said wide superconductors in position to apply to the said edge portions a magnetic flux at least as strong as the magnetic flux applied by said control element to the top and bottom surfaces of said relatively wide superconductors.

22. A power cryotron comprising an electrically insulated superconductor tape having a first critical magnetic field strength and arranged in stacked relation to provide a laminated body having top and bottom surfaces and end surfaces and having sides defined by the edges of the tape, and a superconducting control element of second critical magnetic field strength greater than the first critical magnetic field strength, said control element being in the form of a ring and enclosing only the sides and end surfaces of the laminated body to apply to the said edge portions a magnetic flux for switching the superconductor tape.

23. A power cryotron comprising a plurality of electrically insulated layers of relatively wide superconductors having a first critical magnetic field strength, and interconnected to form a continuous relatively long superconducting path and to provide continuous top and bottom surfaces and edge portions extending the length of the superconducting path, a superconducting control element of second critical magnetic field strength greater than the first critical magnetic field strength, said control element being in the form of a ring and disposed adjacent to the edge portions of the said wide superconductors in position to apply to the said edge portions a magnetic flux at least as strong as the magnetic flux applied by said control element to the top and bottom surfaces of the wide superconductors, and a body of relatively low magnetic inductance enclosing the wide superconductors and the control element and providing low magnetic inductance paths around the said control element.

24. A power cryotron comprising an electrically insulated bifilar-wound superconducting tape having a first critical magnetic field strength and arranged in stacked relation to provide a laminated body having top and bottom surfaces and end surfaces and having sides comprising the edges of the tape, a superconducting control element of second critical magnetic field strength greater than the first critical magnetic field strength, said control element being in the form of a coil of height approximating the height of the laminated body and disposed to enclose the end surfaces and the sides of said body in closely spaced relation to said body sides and a body of iron disposed around and adjacent to the control coil and providing a path of low magnetic inductance around the control coil between the top and bottom surfaces of the said laminated body.

References Cited by the Examiner

UNITED STATES PATENTS

| 3,015,041 | 12/1961 | Young | 338—32 |
| 3,054,978 | 9/1962 | Schmidlin et al. | 338—32 |
| 3,116,422 | 12/1963 | May et al. | 338—32 |
| 3,141,979 | 7/1964 | Rinia et al. | 307—88.5 |
| 3,245,020 | 4/1966 | Lentz | 338—32 |

FOREIGN PATENTS 908,704  10/1962  Great Britain.

RICHARD M. WOOD, *Primary Examiner.*

W. D. BROOKS, *Assistant Examiner.*